(12) United States Patent  (10) Patent No.: US 7,712,728 B2
Kehrer                      (45) Date of Patent:     May 11, 2010

(54) LIQUID DISTRIBUTOR

(75) Inventor: Florian Kehrer, Effretikon (CH)

(73) Assignee: Sulzer Chemtech AG, Winterthur (CH)

( * ) Notice: Subject to any disclaimer, the term of this patent is extended or adjusted under 35 U.S.C. 154(b) by 148 days.

(21) Appl. No.: 10/780,243

(22) Filed: Feb. 17, 2004

(65) Prior Publication Data

US 2004/0182013 A1    Sep. 23, 2004

(30) Foreign Application Priority Data

Mar. 17, 2003 (EP) .................................. 03405181

(51) Int. Cl.
*B01F 3/04* (2006.01)
(52) U.S. Cl. .......................... 261/97; 261/99; 261/110; 261/112.1
(58) Field of Classification Search .................. 261/97, 261/98, 99, 110, 111, 112.1, 112.2
See application file for complete search history.

(56) References Cited

U.S. PATENT DOCUMENTS

| 3,284,068 | A | * | 11/1966 | Goettl ........................ 261/97 |
| 3,290,025 | A | * | 12/1966 | Engalitcheff, Jr. ........ 261/140.1 |
| 4,729,857 | A | * | 3/1988 | Lee et al. ..................... 261/97 |
| 4,816,191 | A | * | 3/1989 | Berven et al. ................ 261/97 |
| 4,846,266 | A | * | 7/1989 | Acker et al. ................ 165/115 |
| 4,855,089 | A | * | 8/1989 | Michels ....................... 261/97 |
| 5,906,773 | A | * | 5/1999 | Hausch et al. ............... 261/97 |
| 6,293,526 | B1 | * | 9/2001 | Fischer et al. ............... 261/97 |
| 6,527,258 | B2 | * | 3/2003 | Bartlok ....................... 261/97 |
| 6,575,437 | B2 | * | 6/2003 | Fischer et al. ............... 261/97 |
| 6,722,639 | B2 | * | 4/2004 | Ender et al. ................. 261/97 |
| 2001/0038155 | A1 | * | 11/2001 | Bachmann et al. ........... 261/97 |

* cited by examiner

*Primary Examiner*—Scott Bushey
(74) *Attorney, Agent, or Firm*—Francis C. Hand; Carella, Byrne, Cecchi

(57) ABSTRACT

The fine distributor for a liquid includes a primary distribution stage that has a plurality of outlet openings and a secondary distribution stage that has distribution gutters below the primary distribution stage. A mesh structure leads from the primary to the secondary distribution stage to further distribute the descending liquid laterally. One outlet opening or a group of outlet openings in the primary stage are associated with each guide mens and also a distribution gutter is associated with each guide means. Each guide means, by means of which liquid (23) can be directed from the at least one associated outlet opening to the secondary distribution stage, extends from the primary distribution stage to the associated distribution gutter and also through it and forms a drip edge (45) for the liquid supplied below the distribution gutter. Each guide means has at least partially a three-dimensional structuring and also a regular perforation. Each distribution stage is formed as a stagnation space in which a distribution of the liquid takes place with the use of a throttle means (25) and on the basis of a hydrodynamic balance.

17 Claims, 3 Drawing Sheets

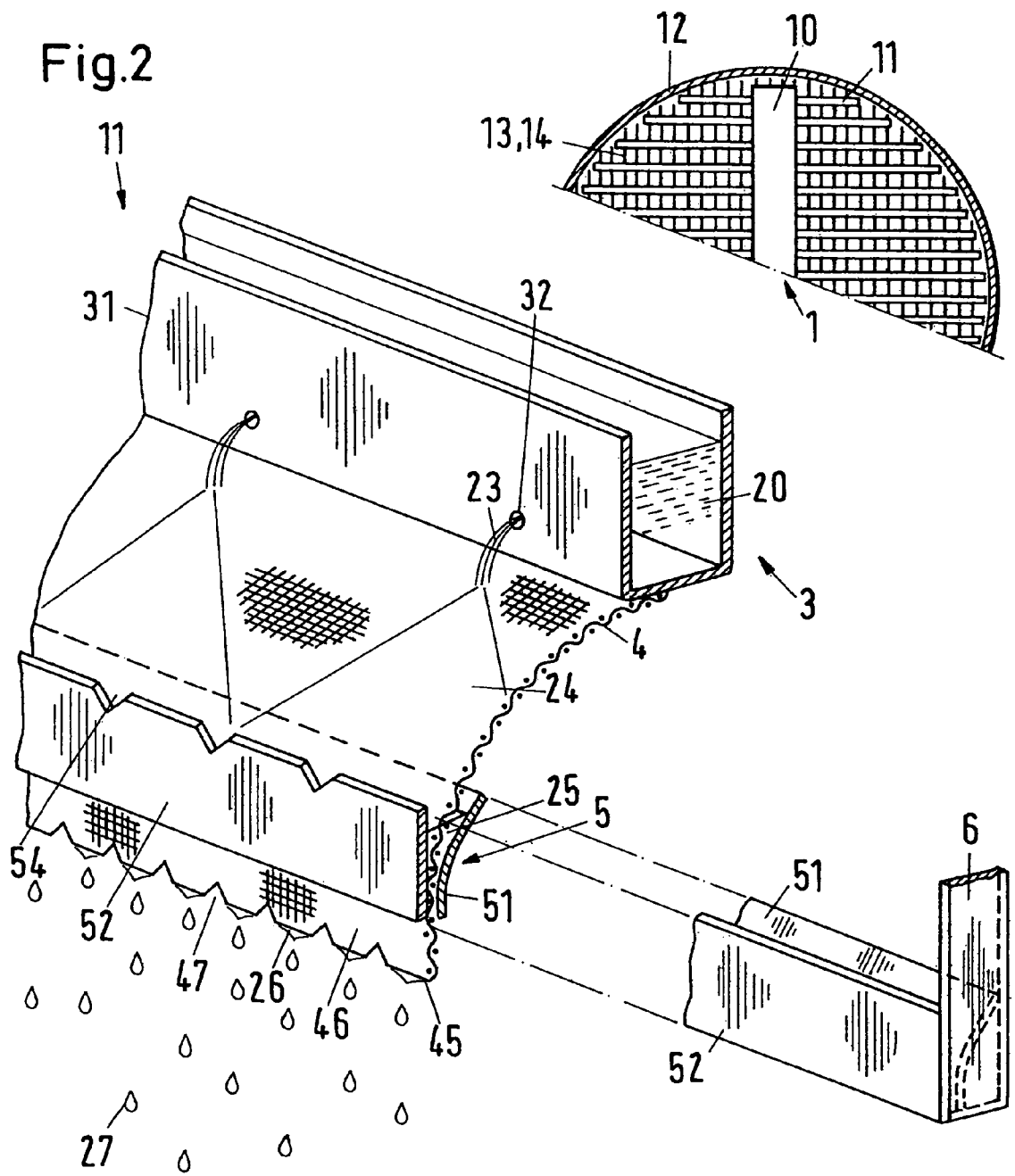

LIQUID DISTRIBUTOR

This invention relates to a liquid distributor. More particularly, this invention relates to a fine distributor for a liquid. Still more particularly, this invention relates to a column having a structured packing and a fine distributor.

A number of liquid distributors are known for columns employing structured packings and the like that facilitate an even sprinkling of a packing with small amounts of liquid. A distributor of this kind is known from EP-A-0 512 277 in which the liquid is directed further downwardly at distribution gutters in pots and out of these evenly to finger-like guide elements. The liquid is led from openings of the pots via wire pieces to the guide elements and directed further on the latter to drip tips. The guide elements in each pot are bent radially outwardly in such a way that all drip tips of the liquid distributor are arranged over the packing in an even distribution.

Other distributors are known from EP 1 153 639, EP 1 005 889, German OS 2 206 230 and U.S. Pat. No. 5,783,119.

It is an object of the invention to provide a fine distributor for liquids which makes possible an even distribution of minute amounts of liquid with the use of simple means.

Briefly, the invention provides a fine distributor for a liquid that includes a primary distribution stage, which has a plurality of outlet openings, and a secondary distribution stage which is arranged below the primary distribution stage and includes distribution gutters. In addition, areal guide means lead from the primary distribution stage to the secondary distribution stage.

Each guide means is associated with an outlet opening or a group of outlet openings in the primary distribution stage and also with a distribution gutter so that liquid can be directed out of the associated outlet opening to the secondary distribution stage. Each guide means extends from the primary distribution stage to the associated distribution gutter and also through the gutter and forms a drip edge below the distribution gutter for the liquid which has been fed to the gutter. Each guide means has at least partially a three-dimensional structuring and also a regular perforation.

Each distribution gutter is formed as a stagnation space in which a distribution of the liquid occurs with the use of a throttle means and on the basis of a hydrodynamic balance.

In one embodiment, the liquid distributor comprises at least one channel for receiving a flow of liquid, which channel has a plurality of outlet apertures at longitudinally spaced apart points for an outflow of liquid from the channel in a plurality of streams; an areal guide means extending below the channel to receive and laterally disperse at least one of the streams of liquid flowing from the apertures of the channel, which guide means has a drip edge at a lower end for dispensing drops of the liquid received thereon along longitudinally spaced apart points; and at least one gutter disposed below the channel with the guide means passing therethrough.

The gutter also has a throttle means for distributing the liquid descending on the guide means by means of a hydrodynamic balance. In particular, the gutter includes a pair of walls that define the throttle means by defining a downwardly tapering region and a gap with the guide means disposed in and extending through the gap. In addition, the guide means is in contact with each wall.

The guide means may be in the form of a mesh having a fine mesh structure for distribution of a liquid with low viscosity or a mesh having a coarse mesh structure to define broad gaps between the mesh and the walls of the gutter for distribution of a liquid with high viscosity.

In one embodiment, the gutter is disposed below and in parallel to a channel while in a second embodiment, the gutter is disposed in perpendicular relation to a plurality of channels.

These and other objects and advantages of the invention will become more apparent from the following detailed description taken in conjunction with the accompanying drawings wherein:

FIG. 1 illustrates a schematically illustrated plan view of a liquid distributor in accordance with the invention which is arranged over a structured packing in a column;

FIG. 2 illustrates a partial view of a channel, guide means and gutter of a fine distributor in accordance with the invention;

Figure 3:
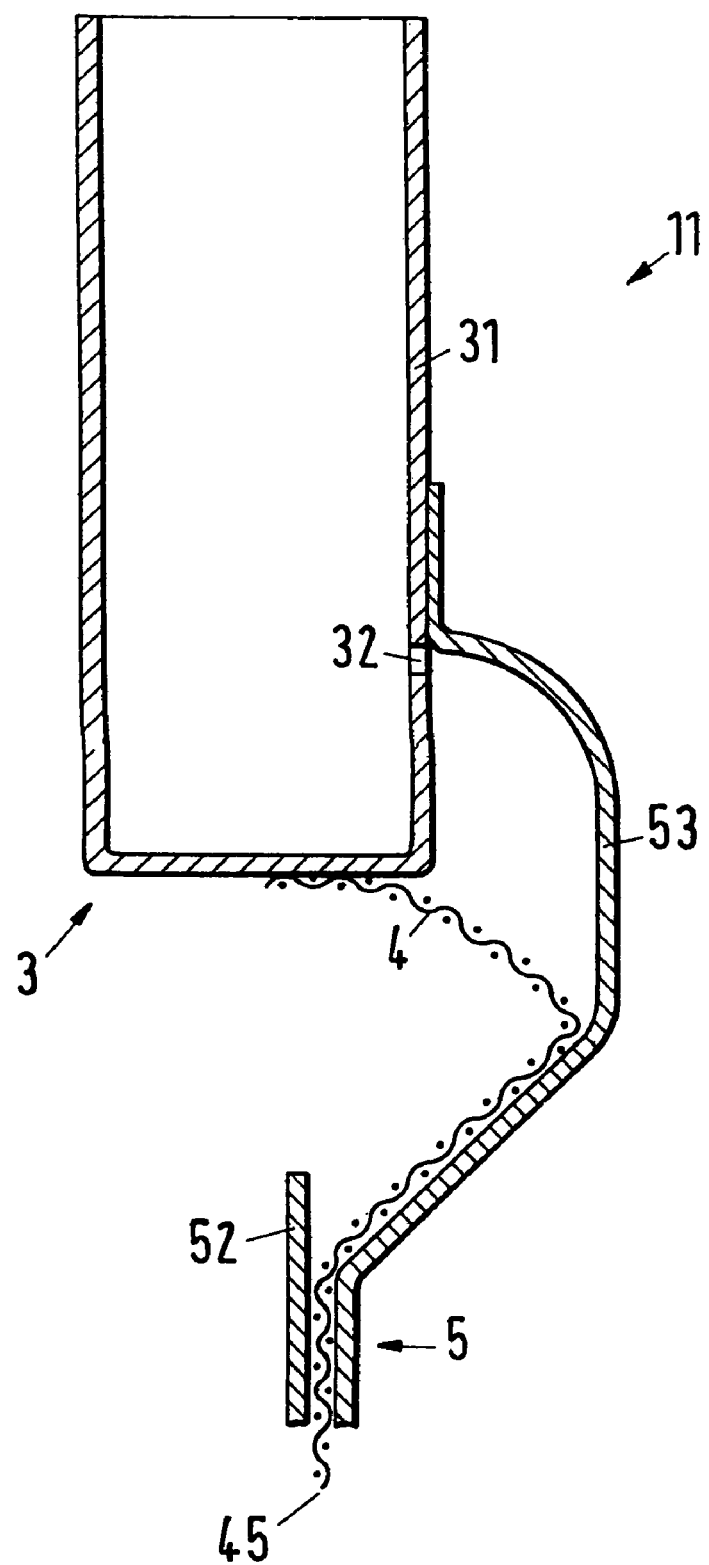
FIG. 3 illustrates a cross-section through a second embodiment of a channel, guide means and gutter of a fine distributor in accordance with the invention.

Referring to FIG. 1, a column 12 is provided with a liquid distributor 1 for dispensing liquid onto a structured packing 13 formed with vertical layers 14 of conventional structure.

The liquid distributor 1 is a fine distributor with which a fine distribution of a liquid can be performed. The distributor 1 includes a main channel 10 and a plurality of fine distributor elements 11 which are arranged below the main channel 10 and are aligned transversely (perpendicular to or at an angle different from 90°) to the layers 14. Parts of the fine distributor elements 11 which are arranged at the top form a primary distribution stage, while parts arranged at the bottom form a secondary distribution stage.

Referring to FIG. 2, the fine distributor element 11 includes a channel 3 for receiving a flow of liquid 20, which channel 3 is part of the primary distribution stage. The channel 3 has outlet apertures 32 in a vertical wall 31, which can also be at an angle. The outlet apertures 32 are disposed at longitudinally spaced apart points for an outflow of liquid from the channel 3 in a plurality of jet streams.

The thickness of the wall 31 is typically smaller than the diameter of the smallest outlet aperture 32.

An additional outlet opening (not illustrated) or several openings can be provided above an outlet opening 32 in a lower part of the channel 3.

Instead of a channel open towards the top, a tube can be used in which outlet apertures in the side are arranged on the level of a tube axis or near this level.

A distribution gutter 5 is arranged at a level below and under the channel 3, the gutter 5 being part of a secondary distribution stage. The gutter 5 is associated with the channel 3 and is aligned at least almost parallel to the channel 3. The distribution gutter 5 advantageously has a length of 40 to 60 cm.

An areal guide means 4 extends from the channel 3 to and through the associated distribution gutter 5 to a drip edge 45 to receive and laterally disperse the streams of liquid flowing from the apertures 32 of the channel 3. The drip edge 45 at the lower end dispenses drops of the liquid along longitudinally spaced apart points.

The guide means 4 has a three-dimensional structuring and also a regular perforation. The guide means 4 is made of a metal weave, for example or a fine mesh expanded grid on which the incident liquid jets 23 are pre-distributed by a transverse propagation 24.

The distribution gutter 5 includes two sheet metal walls or flanks 51, 52 which form a downwardly tapering region which merges into a gap. The areal and structured guide means 4 is in uniform contact in the gap along the entire distribution gutter 5 with the inner surfaces of the two sheet metal walls 51, 52. The walls 51,52 thus function as a throttle means 25 which exerts a resistance on the stream of the fluid 20 which is flowing down on the guide means 4.

Sheet metal strips 6 are provided on the two ends of the distribution gutter 5, from which only one is illustrated, to obstruct the liquid 20 from leaking out at the side. The distribution gutter 5 can be secured on the channel 3 with the two sheet metal strips 6.

The guide means 4 has—contrary to what is shown—a width which extends to the two sheet metal strips 6. In this way, the distribution gutter 5 is formed as a stagnation space in which a further distribution of the liquid can take place by means of a hydrodynamic balance.

The drip edge 45 is advantageously subdivided into narrow segments 46 which are separated from one another by gusset-shaped cut-outs 47. In an ideal embodiment of the fine distributor element 11 with a horizontal alignment, liquid collects at the lower edges of all segments 46 and separates from the drip edge 45 along the entire drip edge 45 in the form of drops 27.

Groove-like recesses 54 can also be provided at the upper edge of the sheet metal flank 52. If too much liquid piles up in the distribution gutter 5, then recesses such as these function as overflow points, by means of which an even distribution of the excess liquid is made possible.

The effect of the throttle means 25 serving for the hydrodynamic balance depends on the viscosity of the liquid 20 and the structuring of the guide means 4. The structuring of the guide means 4 is formed corresponding to the viscosity of the liquid to be distributed. The guide means 4 advantageously has a uniform and fine structuring for the distribution of a liquid 20 with low viscosity. For the distribution of a viscous liquid 20 which has a high viscosity, a coarse structuring, for example a grooving can be superimposed on a fine structuring. Relatively broad gaps between the guide means 4 and the sheet metal walls 51, 52 result from the coarse structuring. The viscous liquid 20 mainly flows away through these gaps.

The guide means 4 is preferably a metal fabric, in particular a so-called "five shaft fabric" or a simple square mesh fabric. The five shaft fabric is a five binding Atlas weave which has two surfaces structured in very different ways. The one surface is particularly well-suited for the formation of a trickle film. Thus, the five shaft weave is preferably used for the manufacture of structured packings. This weave is also advantageous for use in the fine distributor 1.

Referring to FIG. 3 wherein like reference characters indicate like parts as above, a second areal guide means 53 which connects the channel 3 with the distribution gutter 5 may be used. This second guide means 52 also has the function of directing liquid 20 which comes out of the openings 32 in the wall 31 of the channel, as non-illustrated jets, downwardly to the first guide means 4. This first guide means 4 screens off the free space between the channel 3 and the second guide means 53 towards the bottom. Together with the guide means 53, the first guide means 4 guides the liquid further downwards into the distribution gutter 5 which is largely formed the same as shown in FIG. 2.

The second guide means 53 is a piece of shaped sheet metal, which produces a mechanically stable connection between the channel 3 and the distribution gutter 5. In particular, the sheet metal guide means 53 forms the one wall (flank) of the distribution gutter 5. The second flank 52 can be connected with the first guide means 4 and the second guide means 53 by means of spot welding. The width of the gap of the distribution gutter 5 depends on the thickness of the first guide means 4.

The maximum distance between adjacent outlet openings 32 of the same channel amounts to 1 meter, preferably not more than 50 cm. The diameters of the outlet opening 32 are selected to be so large that between 1 and 30 liters of the liquid 20 to be distributed can be given off through each outlet opening 32 per hour.

The packing 13 has vertical layers 14 and the distribution channels 5 of the distributor 1 are arranged transversely (perpendicular to or at an angle different from 90°) to these layers 14. The layers 14 are manufactured from foils for example, which respectively have a three-dimensional structuring and also a regular perforation. The first guide means 4 of the fine distributor 1 is advantageously also manufactured from this foil or a similar one.

Figure 4:
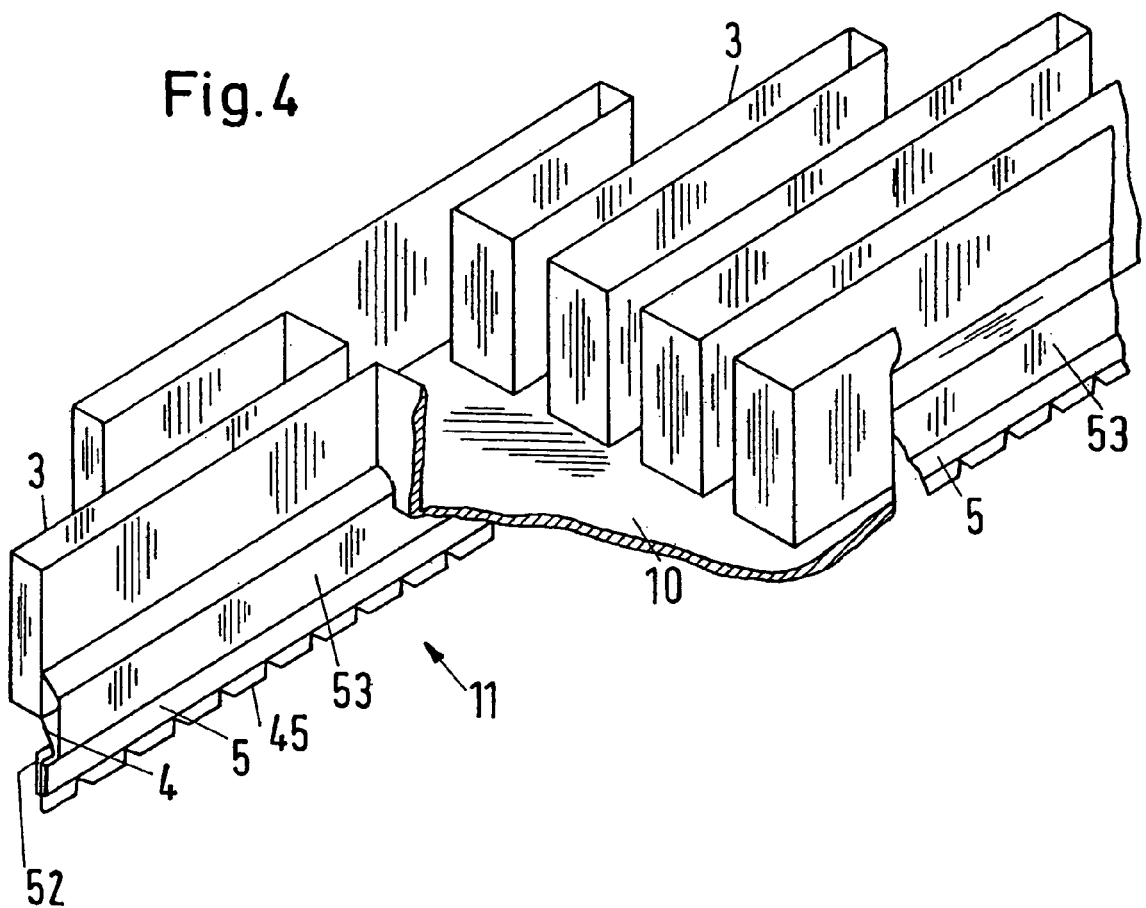
FIG. 4 illustrates a part perspective view of a liquid distributor constructed in accordance with the invention.

Referring to FIG. 4, wherein like reference characters indicate like parts as above, the liquid distributor 1 includes a main channel 10 and auxiliary channels 3 (primary distribution stage) which are arranged on the same level. The fine distributor elements 11 are designed substantially the same as those of FIG. 3. The zone below the main channel is advantageously bridged by the distribution gutter 5.

Figure 5:
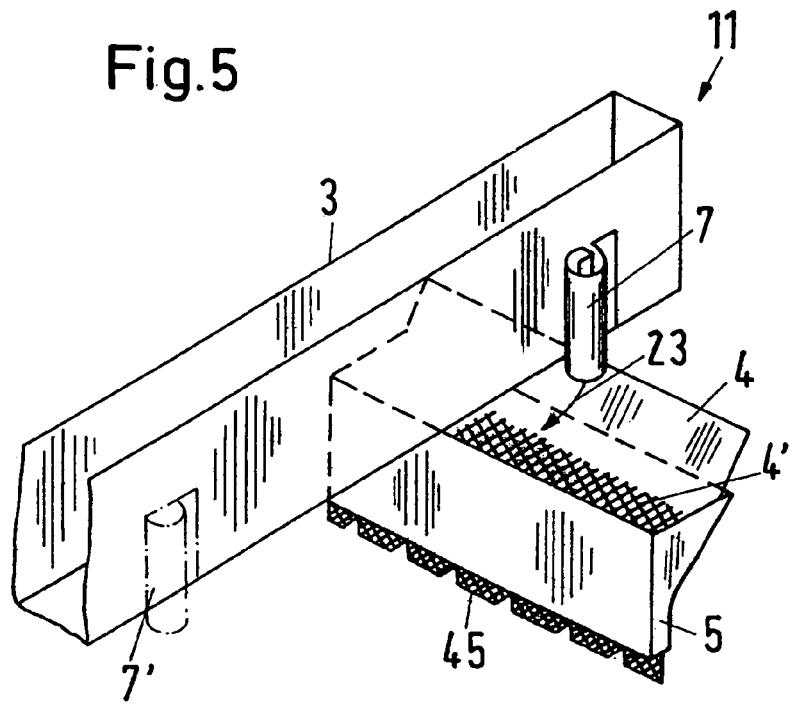
FIG. 5 illustrates a further embodiment of a liquid outlet aperture in accordance with the invention.

Referring to FIG. 5, wherein like reference characters indicate like parts as above, the channel 3 of the liquid distributor element 11 may have apertures formed by tubular guide organs 7 that feed the liquid 23 to a gutter 5 of a secondary distribution stage of the fine distributor element 11. The distribution gutter 5 of the secondary distribution stage is orientated here transversely to the auxiliary channel 3. The guide organ 7 directs—as described in a publication, EP-A-1 153 640—the liquid 23 on a helical path onto the guide means 4.

The guide means 4 has a three-dimensional structuring and also a regular perforation in a lower region 4'. The lower region 4' can consist of a metal fabric, which lies on a smooth sheet metal foil. The liquid 23 flows initially on the sheet metal foil in the direction of the fall-line and is subsequently distributed by the fabric and the distribution gutter 5 transversely i.e. transversely to the fall-line. Only one guide organ 7 is associated with a distribution gutter 5 respectively.

A second guide organ 7' of the auxiliary channel 3 shown is drawn in chain-dotted lines. This second guide organ 7' is associated with a distribution gutter 5 (not illustrated).

The liquid distributor known from EP-A-1 153 640 is further developed to a fine distributor with the fine distributor element 11. Thanks to the fine distributor elements 11, a larger distance between adjacent auxiliary channels 3 can be selected than with the known distributors.

Small amounts of liquid can be uniformly distributed on a packing of the column with the fine distributor.

The invention thus provides a liquid distributor that is able to evenly distribute liquid in minute amounts in the form of small drops.

What is claimed is:

1. A liquid distributor comprising
   at least one channel for receiving a flow of liquid, said channel having a plurality of outlet apertures at longitudinally spaced apart points for an outflow of liquid from said channel in a plurality of streams;
   a sheet of metal weave extending below said channel to receive and laterally disperse at least some of the streams of liquid flowing from said apertures of said channel, said sheet of metal weave having a drip edge at a lower end for dispensing drops of the liquid received thereon along longitudinally spaced apart points; and at least one distribution gutter disposed below said channel having a pair of walls defining a downwardly tapering region and a gap to form a throttle means with said sheet of metal weave passing between said walls and through said gap for distributing the liquid descending on said sheet of metal weave by means of a hydrodynamic balance.

2. A liquid distributor as set forth in claim 1 wherein said gutter is disposed in parallel to said channel.

3. A liquid distributor as set forth in claim 1 wherein said sheet of metal weave is in contact with each said wall.

4. A liquid distributor as set forth in claim 1 wherein said sheet of metal weave is a mesh having a fine mesh structure for distribution of a liquid with low viscosity.

5. A liquid distributor as set forth in claim 1 wherein said sheet of metal weave is a mesh having a coarse mesh structure to define broad gaps between said mesh and said walls of said gutter for distribution of a liquid with high viscosity.

6. A liquid distributor as set forth in claim 1 wherein said walls of said distribution gutter are made of sheet metal.

7. A liquid distributor as set forth in claim 1 wherein said drip edge of said sheet of metal weave has a plurality of recesses at spaced apart intervals.

8. A liquid distributor as set forth in claim 1 wherein said outlet apertures in said channel are spaced apart a maximum distance of 1 meter and are sized to deliver liquid at a rate of from 1 to 30 liters per hour.

9. A liquid distributor as set forth in claim 1 further comprising a guide means extending between said channel and said distribution gutter for directing said streams of liquid from said channel towards said gutter.

10. A liquid distributor as set forth in claim 9 wherein said guide means is an extension of one of said walls of said gutter.

11. A liquid distributor as set forth in claim 1 wherein at least one of said outlet apertures in said channel is a tubular guide organ for directing liquid in a helical path onto said sheet of metal weave.

12. A liquid distributor as set forth in claim 1 wherein said drip edge of said sheet of metal weave is subdivided into narrow segments and alternating gusset-shaped cut-outs.

13. A column comprising
a structured packing; and
a liquid distributor disposed above said packing for distributing liquid over and onto said packing, said distributor having a primary distribution stage including a plurality of channels for receiving liquid, each said channel having a plurality of outlet apertures at longitudinally spaced apart points for an outflow of liquid from said channel in a plurality of streams; a plurality of sheets of metal weave, each said sheet defining a guide means, each said guide means extending below a respective one of said channels to receive and laterally disperse at least one of the streams of liquid flowing from said apertures of said channel, each said guide means having a drip edge at a lower end for dispensing drops of the liquid received thereon along longitudinally spaced apart points onto said packing; and a plurality of distribution gutters, each said distribution gutter being disposed below at least one of said channels with a respective one of said guide means passing therethrough, each said distribution gutter having a pair of walls defining a downwardly tapering region and a gap to form a throttle means with a respective one of said guide means passing between said walls and through said gap for distributing the liquid descending on said guide means by means of a hydrodynamic balance.

14. A column as set forth in claim 13 wherein each said gutter is disposed in parallel to and below a respective one said channels.

15. A column as set forth in claim 13 wherein each said respective guide means is in contact with each said wall of a respective distribution gutter.

16. A column as set forth in claim 13 wherein each said gutter is disposed in perpendicular relation to a plurality said channels.

17. A liquid distributor comprising
at least one channel for receiving a flow of liquid, said channel having a plurality of outlet apertures at longitudinally spaced apart points for an outflow of liquid from said channel in a plurality of streams;
an areal metal mesh guide means extending below said channel to receive and laterally disperse at least one of the streams of liquid flowing from said apertures of said channel, said guide means having a drip edge at a lower end for dispensing drops of the liquid received thereon along longitudinally spaced apart points; and
at least one distribution gutter disposed below said channel with said guide means passing therethrough, said gutter having a pair of walls defining a throttle means for distributing the liquid descending on said guide means by means of a hydrodynamic balance, said walls defining a downwardly tapering region and a gap with said guide means disposed in and extending through said gap, said guide means being in contact with each said wall.

* * * * *